May 23, 1967  D. M. PETERSON ETAL  3,321,565
METHOD OF MANUFACTURING A FRICTION CLUTCH
Filed Jan. 3, 1964
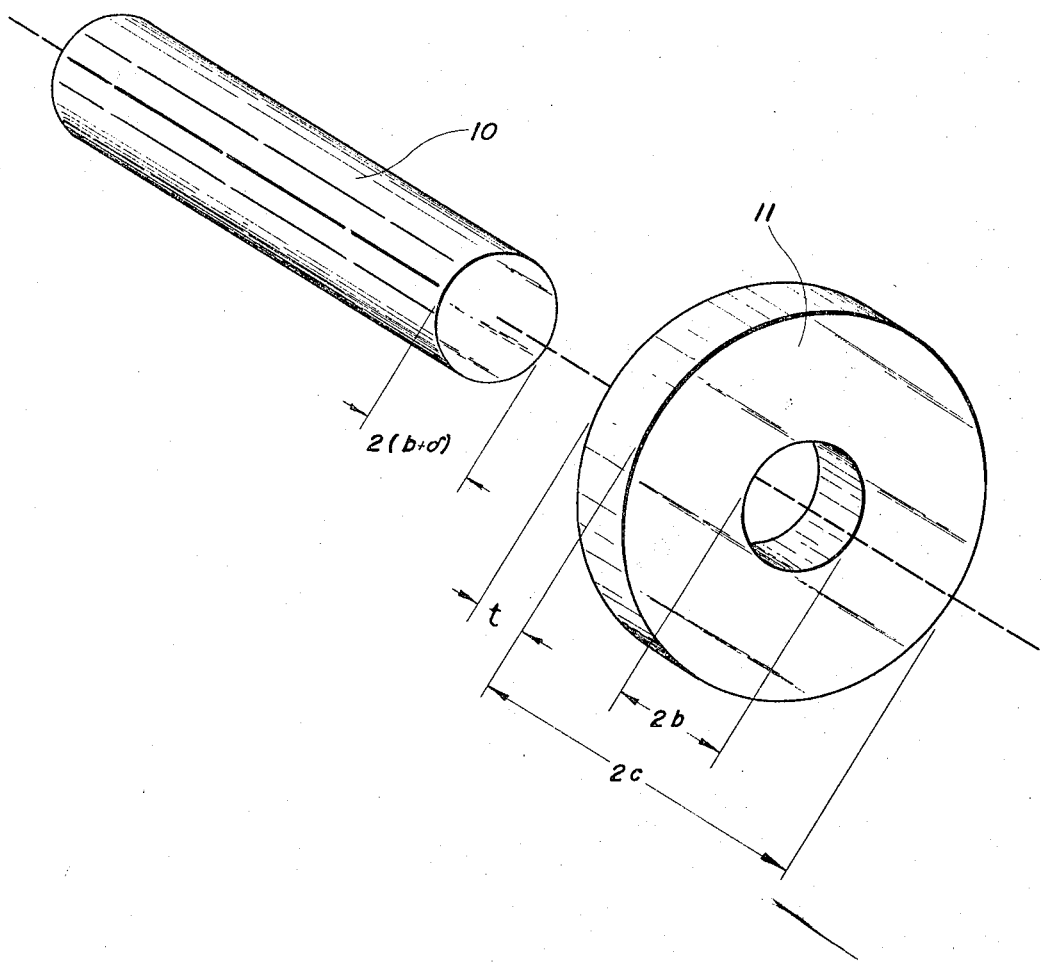
DEAN M. PETERSON
HARVEY F. ROLLER
INVENTORS
BY R. Frank Smith
Eugene S. Stephens
ATTORNEYS 3,321,565
METHOD OF MANUFACTURING A FRICTION CLUTCH
Dean M. Peterson and Harvey F. Roller, both of Rochester, N.Y., assignors to Eastman Kodak Company, Rochester, N.Y., a corporation of New Jersey
Filed Jan. 3, 1964, Ser. No. 335,626
8 Claims. (Cl. 264—162)

This invention relates to a method of manufacturing a friction clutch and more particularly to a method of molding a friction clutch member directly onto its supporting shaft.

The conventional method of manufacturing a friction clutch such as an overload clutch involves the use of friction members (usually adjustable) spring retards, or viscous media. All of these require precision factory adjustment and several assembly operations. In addition, concentricity and exacting dimensional control are involved, and such devices require a relatively large amount of space.

An object of this invention is to overcome these disadvantages by molding a friction clutch member directly onto its supporting shaft.

Another object of the invention is to reduce the cost and complexity of manufacturing friction clutches having accurate slip ratings.

Another object of the invention is to eliminate assembly operations as well as the number of parts or members needed in the manufacture of friction clutches.

These and other objects of the invention are accomplished by molding directly onto a supporting shaft a friction clutch member formed of a moldable material having a higher coefficient of thermal expansion than the shaft.

The invention will be more completely understood by reference to the following desecription considered in relation to the drawing which shows an exploded view of a supporting shaft and a friction clutch member.

Many parameters are involved in fitting a friction clutch member to its support shaft so as to achieve a desired interference and slip or overload torque, and additional parameters are involved in molding such a clutch member directly onto its support shaft. The solution of appropriate values for all these parameters for producing the required overload torque is thus complex, but can be successfully approached by using shrink-fit calculations to determine the sizes desirable for the shaft and clutch member and by adjusting molding parameters within normal ranges to produce the precise overload torque desired.

Using the following equalities:

$$f_f = \mu N = T/b; \quad P = N/A; \quad A = 2\pi bt$$

Therefore:

$$T/2\pi b^2 \mu t \quad (1)$$

Where:
P = pressure between the two assembled elements
$f_f$ = force of friction
N = normal force
$\mu$ = coefficient of friction between the elements
T = torque required for overload
A = total annular area comprising the frictional surface at the interface of the two elements
t = thickness of the disk
b = inside radius of the disk Using the well known formula for shrink fits (adjusted for this specific case):

$$\frac{bP}{E_D}\left(\frac{b^2+c^2}{c^2-b^2}+\sigma D\right)+\frac{bP}{E_B}(1-\sigma B)=\delta \quad (2)$$

Gives the required interference $\delta$ between shaft and dish.
$E_D$, $E_B$ = moduli of elasticity
$\sigma D$, $\sigma B$ = Poisson's ratio for the individual sections Using the value of P from (1), which is a function of the desired slip or overload torque, and substituting in (2), the amount of interference required for a given overload may be easily computed.

With this information together with the linear coefficients of thermal expansion of the two materials, it is possible to shrink-fit the shaft to the disk by cooling (shrinking) the shaft and heating (expanding) the disk. Once assembled and normalized, the resulting assembly should slip at the torque initially chosen.

Starting with such shrink-fit calculations for clutch and shaft seizes and their interference, the disk 11 or other clutch member may be molded directly onto supporting shaft 10 provided the disk or clutch member has a higher coefficient of thermal expansion than the shaft. Apart from the requirement as to the relative coefficients of thermal expansion of the shaft and clutch member, each member can be selected from a variety of materials. Of course, the materials have to be such as will not fuse together within the operating pressures and temperatures of the mold. The preferred selection of materials for accomplishing the method of the invention is a supporting shaft 10 formed of ground steel, and a thermoplastic disk or clutch member 11, but of course many other metals, plastics, and other materials are also suitable.

Excellent results have been obtained with steel shafts that are centerless ground and polished to a prescribed finish on the surface area on which the disk is to be molded. Of course, the degree of smoothness of the shaft affects the final slip torque. Various lubricants such as silicone, polytetrafluoroethylene spray, molybdenum disulfide powder, etc., can be applied to the shaft prior to molding, and of course such lubricants tend to lessen the overload torque of the finished clutch.

Using the above described steel shafts and materials for disk 11, such as ethyl cellulose thermoplastics, and thermoplastic resins, it was found that dimensions of the disk 11 and shaft 10 as calculated for a shrink-fit produced friction clutches the overload torque of which could be satisfactorily adjusted by varying molding parameters such as mold temperatures and pressures within normal ranges. For example, molding temperatures for some thermoplastic resins can vary within a normal range of from 320° F. to 460° F., the higher temperatures tending to increase the resulting overload torque. High molding pressures can also be used to increase the overload torque.

Depending upon the use to be made of the friction clutch, materials should be selected which will be suitable with respect to wear, creep, impact, absorption, etc. Clutch members of thermoplastic resin, such as the polyacetal resin marketed under the Du Pont trademark "Delrin," molded onto steel shafts have performed well, resisting wear and torque instability. Such friction clutches have delivered 7–10 oz. in. of slip torque throughout a temperature range of from 0° F. to 160° F.

The advantages of molding a friction clutch member directly onto its support shaft include compactness of design, elimination of assembly operations, accurate slip ratings in spite of dimensional tolerance in shaft diameter, low cost, and lack of necessity for any adjustment.

The invention has been described in detail with particular reference to preferred embodiments thereof, but it will be understood that variations and modifications can be effected within the spirit and scope of the invention as described hereinabove and as defined in the appended claims.

We claim:

1. A method of forming an accurate slip rated friction clutch comprising a supporting shaft and a friction clutch member in which a predetermined overload torque causes slip between the shaft and clutch member, the steps comprising: forming an annular smooth surface area on a cylindrical supporting shaft; molding, directly onto said annular smooth surface area at an elevated pressure and temperature, an annular disk of a thermoplastic material having a coefficient of thermal expansion higher than the coefficient of thermal expansion of the shaft, the shaft and thermoplastic material being such as will not fuse together during the molding; and reducing the molding pressure and cooling the shaft and disk to cause pressure interference between the disk and shaft to provide a force of friction which can be overcome by a predetermined overload torque to produce slip.

2. The method according to claim 1 wherein the thermoplastic material is selected from the group consisting of ethyl cellulose thermoplastics and thermoplastic resins.

3. The method according to claim 1 wherein the thermoplastic material is a polyacetal resin.

4. The method according to claim 1 wherein the shaft is steel and the smooth surface area is formed by grinding and polishing.

5. The method according to claim 4 wherein the thermoplastic material is selected from the group consisting of ethyl cellulose thermoplastic and thermoplastic resins.

6. The method according to claim 4 wherein the thermoplastic material is a polyacetal resin.

7. The method according to claim 1 wherein the elevated molding temperature is within the range of 320 degrees F. to 460 degrees F.

8. A method of forming an accurate slip rated friction clutch comprising a supporting shaft and a friction clutch member in which a predetermined overload torque causes slip between the shaft and clutch member, the steps comprising: forming an annular smooth surface area on a cylindrical supporting shaft; lubricating the annular smooth surface area; molding, directly onto the lubricated annular smooth surface area at an elevated pressure and temperature, an annular disk of a thermoplastic material having a coefficient of thermal expansion higher than the coefficient of thermal expansion of the shaft, the shaft and thermoplastic material being such as will not fuse together during the molding; and reducing the molding pressure and cooling the shaft and disk to cause pressure interference between the disk and shaft to provide a force of friction which can be overcome by a predetermined overload torque to produce slip.

References Cited by the Examiner

UNITED STATES PATENTS

| 2,643,531 | 6/1953 | Haynes | 64—30 |
| 3,050,351 | 8/1961 | Kempf | 308—174 |
| 3,080,735 | 3/1963 | Blom et al. | 64—30 XR |
| 3,146,612 | 9/1964 | Lorenz | 64—30 XR |
| 3,186,190 | 6/1965 | Maillot | 64—30 |

ROBERT F. WHITE, *Primary Examiner.*

ALEXANDER H. BRODMERKEL, *Examiner.*

T. J. CARVIS, *Assistant Examiner.*